(12) United States Patent
Lin

(10) Patent No.: US 8,103,727 B2
(45) Date of Patent: Jan. 24, 2012

(54) USE OF GLOBAL INTELLIGENCE TO MAKE LOCAL INFORMATION CLASSIFICATION DECISIONS

(75) Inventor: Kunhua Lin, Coquitlam (CA)

(73) Assignee: Fortinet, Inc., Sunnyvale, CA (US)

( * ) Notice: Subject to any disclaimer, the term of this patent is extended or adjusted under 35 U.S.C. 154(b) by 591 days.

(21) Appl. No.: 11/847,334

(22) Filed: Aug. 30, 2007

(65) Prior Publication Data

US 2009/0064323 A1    Mar. 5, 2009

(51) Int. Cl.
*G06F 15/16* (2006.01)
(52) U.S. Cl. ......... 709/206; 709/201; 709/202; 709/203
(58) Field of Classification Search ................... 709/206
See application file for complete search history.

(56) References Cited

U.S. PATENT DOCUMENTS

| | | | |
|---|---|---|---|
| 7,287,060 B1 * | 10/2007 | McCown et al. | 709/206 |
| 2004/0003283 A1 * | 1/2004 | Goodman et al. | 713/201 |
| 2004/0215977 A1 * | 10/2004 | Goodman et al. | 713/201 |
| 2006/0149821 A1 * | 7/2006 | Rajan et al. | 709/206 |
| 2007/0130351 A1 * | 6/2007 | Alperovitch et al. | 709/229 |

* cited by examiner

*Primary Examiner* — Dohm Chankong
*Assistant Examiner* — Neeraj Utreja
(74) *Attorney, Agent, or Firm* — Hamilton, DeSanctis & Cha LLP

(57) ABSTRACT

Methods and systems are provided for delaying local information classification until global intelligence has an opportunity to be gathered. According to one embodiment, an initial information identification process, e.g., an initial spam detection, is performed on received electronic information, e.g., an e-mail message. Based on the initial information identification process, classification of the received electronic information is attempted. If the received electronic information cannot be unambiguously classified as being within one of a set of predetermined categories (e.g., spam or clean), then an opportunity is provided for global intelligence to be gathered regarding the received electronic information by queuing the received electronic information for re-evaluation. The electronic information is subsequently classified by performing a re-evaluation information identification process, e.g., re-evaluation spam detection, which provides a more accurate categorization result than the initial information identification process. Handling the electronic information in accordance with a policy associated with the categorization result.

14 Claims, 6 Drawing Sheets

USE OF GLOBAL INTELLIGENCE TO MAKE LOCAL INFORMATION CLASSIFICATION DECISIONS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2007, Fortinet, Inc.

BACKGROUND

1. Field

Embodiments of the present invention generally relate to information classification. In particular, embodiments of the present invention relate to integration of global intelligence regarding email messages and senders into the email delivery network to allow more accurate local spam identification to be performed.

2. Description of the Related Art

One of the problems arising with the proliferation of Internet and email usage, as well as other means of electronic communication, is the receiving of unwanted and unsolicited bulk messages, commonly known as "spam." While similar to the problems associated with physical junk mail, the consequences can be much more severe. Spam can contain viruses or other software that disable or damage the receiver's computer or other electronic equipment. In addition, the volume of spam may represent a significant load on traffic handling mechanisms. For example, high volumes of email spam may negatively affect both client computer networks and the Internet itself. As a result, substantial efforts have been devoted to tracking and identifying spam in order to stop the problem at its source.

Examples of current anti-spam techniques include greylisting, use of greeting delays and use of checksum. Empirical evidence suggests that a great deal of spam is sent from applications designed specifically for spamming. Such applications appear to adopt the "fire-and-forget" methodology in which they attempt to send the spam to a large number of email addresses, but never confirm the spam is delivered or respond to failure indications by retrying as a standard-compliant email server would. This "fire-and-forget" approach is contrary to what well-behaved, Simple Mail Transfer Protocol (SMTP)-compliant MTAs do. Such well-behaved MTAs attempt retries due to SMTP being an unreliable transport and the handling of temporary failures being build into the core specification (i.e., RFC 821).

As a result of the inherent cost incurred by maintaining a retry strategy, greylisting is based on the premise that spammers will not attempt to re-send their messages. Greylisting temporarily rejects messages from unknown sender mail servers. This temporary rejection is designated with a 4xx SMTP error code that is recognized by SMTP-compliant MTAs, which then proceed to retry delivery later. Consequently, the greylisting technique's delayed acceptance of unknown email is effective in dealing with non-SMTP-conforming senders that do not retry. When spammers retry, however, they look just like regular email senders thereby circumventing the greylisting technique as such retries will ultimately be delivered once the blocking expires. In general, the greylisting method is effective in dealing with spam-sending only, non-SMTP-conforming spam senders, but it is ineffective in dealing with an infected email sender that sends a mix of both spam and clean messages or dynamic Internet Protocol (IP) addresses that are constantly reassigned to spammers and regular users. The greylisting method is also ineffective in dealing with spam sending applications that are made to be standard-compliant by, for example, retrying responsive to temporary rejection. In addition, delivery of email messages from new, legitimate, but non-standard compliant servers are delayed or even dropped by the greylisting approach.

With respect to the greeting delay technique, it delays the delivery of all messages, whether suspicious or not. The greeting delay technique is typically a delivery pause introduced by an SMTP server before it sends the SMTP greeting banner to the client. In accordance with RFC 2821, the client is supposed to wait until it has received this banner before it sends any data to the server. However, many spam-sending applications do not wait to receive this banner, and instead start sending data once the Transport Control Protocol (TCP) connection is complete. As a result, the server can detect this and drop the connection. One problem with this approach is that legitimate email senders that do not follow the SMTP specifications exactly may also be caught by this mechanism thereby resulting in loss of valid, non-spam messages.

With respect to the checksum-based filtering approach, it attempts to take advantage of the fact that often all of the messages sent by a particular spammer will be mostly identical. Such filtering approaches attempt to strip out everything that might vary between messages, such as the recipient's name or email address, reduce what remains of the message to a checksum and perform a lookup of the resulting checksum in a database which collects checksums of messages that are known or likely to be spam. This method is easily thwarted as the checksum's reputation is always behind as a result of spammers using obfuscating techniques to make their messages appear unique. The checksum clearing houses typically have difficulty keeping up with the ever changing allegedly spam-associated checksums; and even when the checksums do effectively detect known spam as a result of the delay in making the association, most such spam have already been delivered to end users' inboxes.

In view of the foregoing limitations of anti-spam techniques and the ineffectiveness of various other existing anti-spam methodologies, there is a continuing need for improved anti-spam systems and services.

SUMMARY

Methods and systems are described for delaying local information classification until global intelligence has an opportunity to be gathered. According to one embodiment, an initial information identification process is performed on received electronic information. Based on the initial information identification process, an attempt is made to classify the received electronic information into one of multiple categories. If the received electronic information cannot be unambiguously classified as being within one of the categories in real-time, then an opportunity is provided for global intelligence to be gathered regarding the received electronic information by queuing the received electronic information for a re-evaluation information identification process. Subsequently, the queued electronic information is classified by performing the re-evaluation information identification process, which provides a more accurate categorization result than the initial information identification process; and the queued electronic information is handled in accordance with a policy associated with the categorization result.

According to one embodiment, an initial spam detection on an electronic mail (e-mail) message is performed. Based on the initial spam detection, an attempt is made to classify the e-mail message as clean or spam. If the e-mail message cannot be unambiguously classified in real-time as clean or spam based on the initial spam detection, then an opportunity is provided for global intelligence to be gathered regarding the e-mail message or e-mail messages having similar attributes by queuing the e-mail message for a re-evaluation spam detection. Subsequently, the queued e-mail message is classified as clean or spam by performing the re-evaluation spam detection, the re-evaluation spam detection provides a more accurate spam detection result than the initial spam detection. If the queued e-mail message is classified as clean by the re-evaluation spam detection, then it is delivered to a destination specified within the queued e-mail message. If, however, the queued e-mail message is classified as spam by the re-evaluation spam detection, then it is handled in accordance with an e-mail security policy for spam.

According to another embodiment, a spam detection system includes a global intelligence network having one or more global intelligence servers. The global intelligence servers are coupled to a public network and configured to directly or indirectly (i) gather intelligence from multiple distributed anti-spam engines, (ii) maintain and update e-mail message signatures and associated reputation information, and (iii) readjust spam detection characteristics of the multiple distributed anti-spam engines based on observations and analysis performed by the global intelligence network. The spam detection system also includes a network device coupled to the public network and through which electronic mail (e-mail) messages pass. The network device includes an anti-spam engine of the multiple distributed anti-spam engines. The anti-spam engine is configured to (i) perform reputation analysis and content analysis on the e-mail messages, including querying the global intelligence network for signature reputation information associated with the e-mail messages and (ii) provide the global intelligence network with an opportunity to gather further information to make the content analysis more accurate by queuing e-mail messages for which a satisfactory spam or clean categorization cannot be made in real-time for subsequent reapplication of the reputation analysis or the content analysis.

According to one embodiment, a spam detection system implements a novel architecture comprising a hosted sender reputation database, a hosted spam signature database, a hosted heuristic rules database and an anti spam engine. The anti-spam engine is communicatively coupled to the hosted sender reputation database, the hosted spam signature database and the hosted heuristic rules database via a public network and is configured to receive updated heuristic rules from the hosted heuristic rules database and to perform spam detection by (i) querying the hosted reputation database, (ii) querying the hosted spam signature database and (iii) applying the updated heuristic rules for each of a plurality of electronic mail messages.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
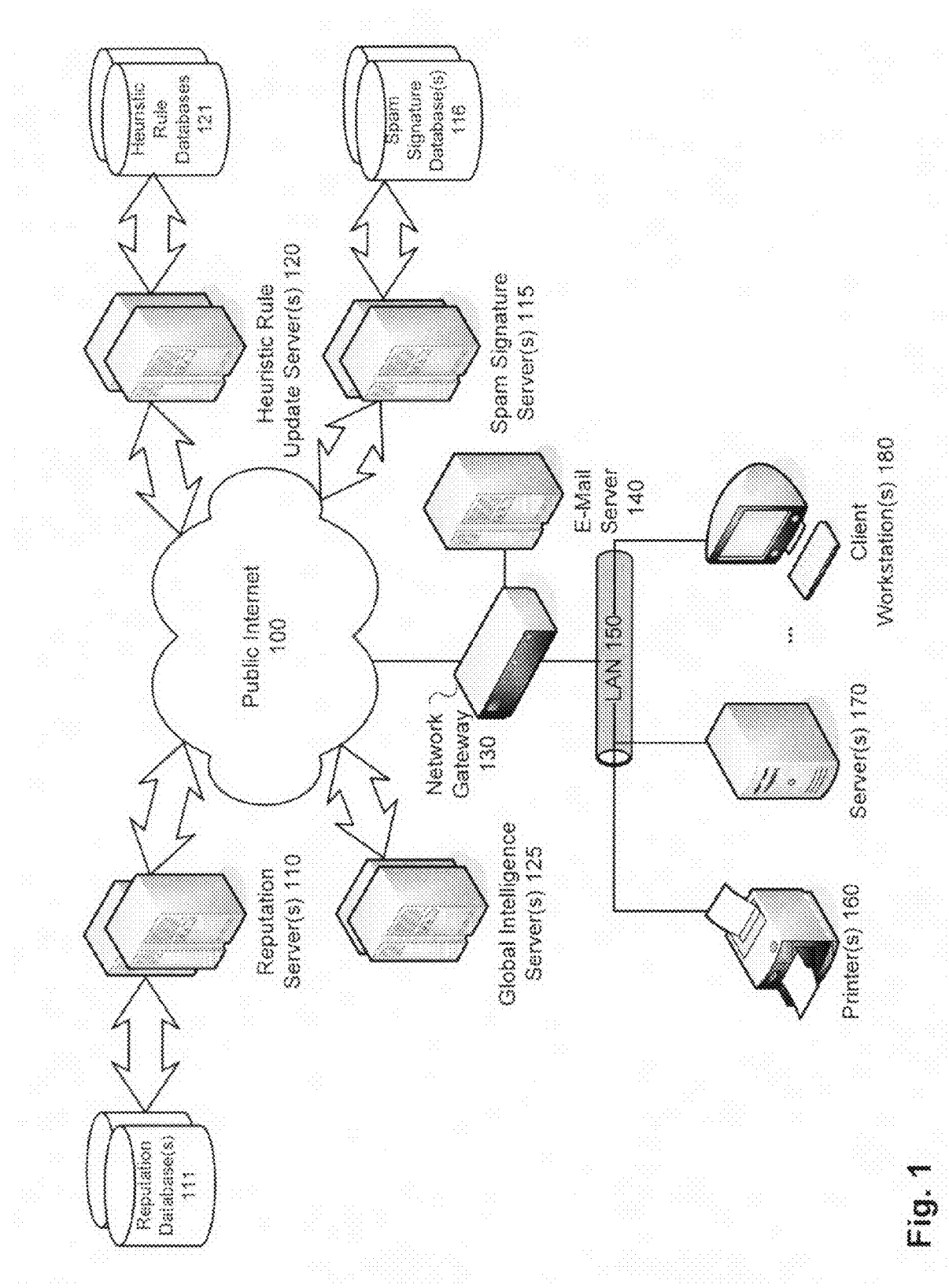
FIG. 1 is a block diagram conceptually illustrating a simplified network architecture in which embodiments of the present invention may be employed.

Methods and systems for delaying local information classification, such as spam identification, until global intelligence has an opportunity to be gathered are described. In accordance with various embodiments of the present invention, intelligence gathering regarding email signature reputations and/or sender reputations is integrated into an email delivery network. In one embodiment, an anti-spam engine integrated within an email server delays the delivery of a message when the message cannot be determined in real-time to be spam or clean. Queuing messages for which a satisfactory determination cannot be made in real-time provides an opportunity for global intelligence to be gathered from this and/or other participating anti-spam engines in the network and results in more accurate detection of spam upon subsequent re-evaluation.

According to one embodiment, a novel 3-tier architecture is provided. An anti-spam engine of an email server, email client, client workstations, network gateway, firewall or other network device through which email messages pass and which is responsible for making local spam determinations queries a sender IP reputation database and a signature database hosted remotely within a global intelligence network in central or distributed servers. Advantageously, in this manner, the anti-spam engine need only cause application of relevant sender reputation information and signature reputation information one message at a time. Meanwhile, a heuristic rule update server associated with the global intelligence network pushes updates to the anti-spam engine. In one embodiment, the full set of heuristic rules are downloaded to the anti-spam engine. For its part, in one embodiment, the anti-spam engine performs spam detection using both (i) the query results from the sender reputation and spam signature databases; and (ii) the heuristic rules. Furthermore, the heuristic rules applied can depend on the query results.

According to one embodiment, when sufficient intelligence has been gathered globally with regard to an email message and/or its associated signature or sender reputation, the message can be re-evaluated. Empirical evidence confirms spam detection is improved as a result of allowing global intelligence to accumulate and then using such global intelligence to make a local spam determination.

Importantly, although various embodiments of the anti-spam engine are discussed in the context of an email server, the anti-spam techniques described herein are equally applicable to email clients, such as Outlook or Thunderbird, client workstations, network gateways, firewalls or other network devices through which email messages pass.

Notably, the methodologies described herein may be applied within the context of various e-mail protocols, including, but not limited to the Simple Mail Transfer Protocol (SMTP), Post Office Protocol version 3 (POP3) and Internet Message Access Protocol (IMAP), as well as various existing and future email network topologies. Additionally, the buffering of email messages and subsequent re-evaluation may be performed in various ways. In one embodiment, the email messages for which a satisfactory spam determination cannot be made in real-time are buffered at the device, e.g., the email server or client workstation, at which the initial spam evaluation was performed. Alternatively, the initial spam evaluation and the re-evaluation may be performed by different devices. In one embodiment, an initial spam evaluation may be performed by an email server. The email messages for which a satisfactory spam determination cannot be made in real-time may be buffered on a client workstation and re-evaluation of the buffered email messages may performed by a local anti-spam engine operable within the client workstation. Similarly, a POP3 or IMAP mail server, from which e-mail subscribers access e-mail messages from a service provider or hosted mail system via the Internet, may locally perform both initial spam evaluation and delayed re-evaluation or the IMAP or POP3 mail server may perform the initial spam evaluation and the client workstation or e-mail client may perform the re-evaluation processing, if necessary. According to one embodiment, a gateway, server or client may make a provisional judgment (e.g., spam, not spam, unknown) regarding an email message, but flag it for subsequent re-evaluation.

For sake of illustration, embodiments of the present invention are described in the context of global intelligence being gathered and analyzed remote from the location at which spam identification is performed; however, the methodologies described herein are helpful in the broader context of information classification more generally and in the specific context of spam identification even in implementations in which the intelligence is gathered and used locally, but over time. For example, intelligence and/or historical data regarding changes in spam trends, patterns and volume observed locally may be used to improve spam detection during re-evaluation processing of messages.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

Terminology

Brief definitions of terms used throughout this application are given below.

The term "client" generally refers to an application, program, process or device in a client/server relationship that requests information or services from another program, process or device (a server) on a network. Importantly, the terms "client" and "server" are relative since an application may be a client to one application but a server to another. The term "client" also encompasses software that makes the connection between a requesting application, program, process or device to a server possible, such as an FTP client.

The phrase "content analysis" generally refers to filtering and/or performing monitoring or scanning of e-mail messages, headers and/or associated attachments, such as application of inbound and/or outbound email filtering, attachment/content filtering, heuristic rules, deep email header inspection, spam URI real-time blocklists (SURBL), banned word filtering, spam quarantining and spam tagging, spam checksum blocklist, spam image analysis scanning, forged IP checking, greylist checking, Bayesian classification, Bayesian statistical filters, signature reputation, and/or filtering methods such as FortiGuard-Antispam, access policy filtering, content filtering, global and user black/white list filtering, spam Real-time Blackhole List (RBL), per user Bayesian filtering so that individual users can set their own profiles, heuristics filtering, denial-of-service (DOS) and directory harvest attacks (DHA) and denial-of-service.

The terms "connected" or "coupled" and related terms are used in an operational sense and are not necessarily limited to a direct connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

The phrase "network gateway" generally refers to an internetworking system, a system that joins two networks together. A "network gateway" can be implemented completely in software, completely in hardware, or as a combination of the two. Depending on the particular implementation, network gateways can operate at any level of the OSI model from application protocols to low-level signaling.

If the specification states a component or feature "may", "can", "could", or "might" be included or have a characteristic, that particular component or feature is not required to be included or have the characteristic.

The term "responsive" includes completely or partially responsive.

The phrase "sender reputation" generally refers to a value indicative of an e-mail message origination's reputation for sending spam or undesired content, such as viruses and malware. Sender reputation may be determined based on persisted data about the observed behavior of an Internet Protocol (IP) address of a sending server in the context of (i) a particular user name at a particular domain, (ii) the particular domain and/or (iii) the overall traffic from the IP address. As such, sender reputation as defined herein is intended to encompass traditional reputation analysis as well as filtering techniques that extend beyond traditional reputation analysis and may be calculated from one or more of various characteristics derived from e-mail message analysis and external testing.

The term "server" generally refers to an application, program, process or device in a client/server relationship that responds to requests for information or services by another program, process or device (a server) on a network. The term "server" also encompasses software that makes the act of serving information or providing services possible.

The term "spam" generally refers to electronic junk mail, typically bulk e-mail in the form of commercial advertising. Often, e-mail message content may be irrelevant in determining whether an e-mail message is spam, though most spam is commercial in nature. There is spam that fraudulently promotes penny stocks in the classic pump-and-dump scheme. There is spam that promotes religious beliefs. From the recipient's perspective, spam typically represents unsolicited, unwanted, irrelevant, and/or inappropriate e-mail messages, often unsolicited commercial email (UCE). In addition to UCE, spam includes, but is not limited to, e-mail messages regarding or associated with fraudulent business schemes, chain letters, and/or offensive sexual or political messages.

According to one embodiment "spam" comprises Unsolicited Bulk Email (UBE). Unsolicited generally means the recipient of the e-mail message has not granted verifiable permission for the e-mail message to be sent and the sender has no discernible relationship with all or some of the recipients. Bulk generally refers to the fact that the e-mail message is sent as part of a larger collection of e-mail messages, all having substantively identical content. In embodiments in which spam is equated with UBE, an e-mail message is considered spam if it is both unsolicited and bulk. Unsolicited e-mail can be normal email, such as first contact enquiries, job enquiries, and sales enquiries. Bulk e-mail can be normal email, such as subscriber newsletters, customer communications, discussion lists, etc. Consequently, in such embodiments, an e-mail message would be considered spam (i) the recipient's personal identity and context are irrelevant because the e-mail message is equally applicable to many other potential recipients; and (ii) the recipient has not verifiably granted deliberate, explicit, and still-revocable permission for the e-mail message to be sent.

The phrase "spam detection" generally refers to one or more techniques for attempting to identify or classify a message as spam/non-spam or otherwise attempting to determine whether a message is spam/non-spam. Spam detection is intended to broadly encompass current and/or future reputation analysis, such as sender IP reputation analysis, and content analysis, individually or in combination.

FIG. 1 is a block diagram conceptually illustrating a simplified network architecture in which embodiments of the present invention may be employed. In this simple example, one or more reputation servers 110, one or more spam signature servers 115, one or more heuristic rule update servers 120 and one or more central global intelligence servers 125 are coupled in communication with the public Internet 100. Collectively, the reputation servers 110, spam signature servers 115, heuristic rule update servers 120 and the central global intelligence servers 125 represent a global intelligence server network. As discussed further below, various subsets of the servers within the global intelligence server network may be distributed or combined together.

Client workstations 180 are coupled in communication with the public Internet 100 via a local area network (LAN) 150 and through a network gateway 130. In the present example, the network gateway 130 is coupled to an email server 140, which incorporates an anti-spam engine (not shown), such as anti-spam engine 241 of FIG. 2, implementing various novel anti-spam methodologies that are described further below.

While in this simplified example, only a single e-mail server (i.e., e-mail server 140) is shown associated with a single LAN (i.e., LAN 150), it should be understood that many other e-mail servers, network gateways, email clients and/or client workstations may be concurrently operating across the globe and performing the anti-spam and content analysis methodologies described herein. As a result, it is to be understood that the anti-spam engine described in the context of the present example may be part of a larger global network of anti-spam engines that together act as intelligence gathering agents on behalf of the global intelligence servers 125.

Returning to the exemplary network architecture of FIG. 1, the reputation servers 110 interface with one or more associated reputation databases 111; the spam signature servers 115 interface with one or more associated spam signature databases 116 and the heuristic rule update servers 120 interface with one or more associated heuristic rule databases 121. In one embodiment, the reputation databases 111 maintain information regarding sender reputation for IP addresses associated with observed e-mail message flow. Together, the reputation servers 110 and reputation databases 111 may represent existing or future reputation services. An existing reputation service that exemplifies various operational characteristics of the reputation servers 110 according to an embodiment of the present invention includes the FortiIP™ sender IP reputation database (available from Fortinet, Inc. of Sunnyvale, Calif.), a global IP reputation database in which the reputation of each IP address is built and maintained based on tens of properties of the IP address gathered from various sources. The properties of an IP address used to maintain reputation may include its "whois" information, geographical location, its service provider, whether it is an open relay or hijacked host, the volume of e-mail messages from this sender, historical e-mail volume patterns, etc.

In one embodiment, the global intelligence servers 125 do not have direct interactions with the anti-spam engines, but rather gather data and perform analysis of data gathered from the other servers participating in the global intelligence network, e.g., the reputation servers 110, the spam signature servers 115 and the heuristic rule update servers 120. In such an embodiment, the global intelligence servers 125 may also distribute the intelligence gleaned from the data gathering and analysis to the anti-spam engines through the servers participating in the global intelligence network. In alternative embodiments, the global intelligence servers 125 may be logically interposed between the anti-spam engines and the other servers participating in the global intelligence network thereby directly receiving queries from the anti-spam engines and allowing the global intelligence servers 125 to gather relevant data from the observed e-mail messages and perform analysis on the gathered data.

In any event, this centralized approach to data gathering and analysis allows the global intelligence servers 125 to gather intelligence helpful for directing and/or controlling the update of (i) sender reputation information, (ii) e-mail message signatures, (iii) associated spam scores, (iv) heuristic rules based on, for example, the query volume and patterns for each signature as observed from the aggregate of all participating anti-spam engines. The global intelligence servers 125 and their interactions with the participating anti-spam engines and/or the servers participating in the global intelligence network facilitate maintenance of large databases of signatures and their corresponding reputations that could not otherwise be pushed to the participating anti-spam engines constantly. Additionally, the real-time intelligence gathering performed by the global intelligence servers 125 makes feasible constant adjustments to the spam detection algorithms by pushing updated heuristic rules to participating anti-spam engines by the heuristic rule update servers 120, thereby enabling the participating anti-spam engines to constantly adapt to changes in observed spam trends.

According to one embodiment, the heuristic rule update servers 120 and associated heuristic rule databases 121 create, maintain and distribute to participating anti-spam engines heuristic rules relating to spam, virus and/or malware detection. The heuristic rule update servers 120 may update the heuristic rules based on and responsive to intelligence gathered from the global intelligence servers 125, offline analysis and/or manual research. In one embodiment, the heuristic rule update servers 120 may constantly adjusts the spam detection algorithms of the participating anti-spam engines by distributing appropriate heuristic rule updates. Current heuristic rule update mechanisms that exemplify the operational characteristics of the heuristic rule update servers 120 according to various embodiments include the FortiGuard™ AntiSpam Service, Symantec Brightmail Anti-Spam™ software and Barracuda Networks Energize Updates.

According to one embodiment, the spam signature servers 115 create, update and maintain e-mail message signatures and associated spam scores. In one embodiment the spam signatures are based on one or more attributes of observed e-mail messages, including, but not limited to, the sender IP address, spamvertised Uniform Resource Identifiers (URIs), the checksum of message objects or mime parts, telephone numbers within the e-mail messages and other attributes that are considered as pseudo signatures of messages. The creation, updating and maintenance of e-mail message signatures and associated spam scores may be based upon direct observation of the e-mail messages by the spam signature servers 115 and/or may be based upon instructions or guidance received by the global intelligence servers 125 as a result of their direct observation of the e-mail message or indirect analysis of data gathered from the span signature servers 115.

In one embodiment, the spam signature databases 116 include multiple types of signatures. For example, one spam signature database may contain information regarding spamvertised URLs. About 90% of spam has one or more Universal Resource Locators (URLs) in the message body. These URLs typically link directly or indirectly to the spammers' website, which promotes their products and/or services. In the context of phishing spam, these URLs typically direct one to a fake bank or other financial institution's website in the hope of obtaining private financial information. Another spam signature database may include information regarding spamvertised email addresses. Similar to the spamvertised URLs, a sizeable portion of spam include one or more email addresses in the message body that prompts one to contact the spammers. By extracting these email addresses from spam samples, these spamvertised email addresses provide another powerful global filter to identify and filter spam. Spam object checksums may be maintained by yet another spam database. According to one embodiment, objects in spam are identified and a fuzzy checksum is calculated based on the objects. The objects can be part of the message body or an attachment. In one embodiment, the spam signature databases 116 include one or more of the FortiSig1 spam signature database, the FortiSig2 spam signature database and the FortiSig3 spam signature database available from Fortinet, Inc. of Sunnyvale, Calif.

While, in order to facilitate explanation, the reputation servers 110, the spam signature servers 115, the heuristic rule update servers 120, the global intelligence servers 125, the network gateway 130 and the e-mail server 410 are generally discussed as if they each were a single device, in actuality, these devices may comprise multiple physical, logical and/or virtual devices or systems connected in a distributed architecture, and the various functions performed may actually be distributed among multiple devices or aggregated within fewer devices. For example, any function can be implemented on any number of machines or on a single machine. Also, any process may be divided across multiple machines. In one embodiment, the functionality of the reputation servers 110, the spam signature servers 115 and/or the heuristic rule update servers 120 may be provided by the global intelligence servers 125; or alternatively, the functionality of the global intelligence servers 125 may be incorporated into one of the other servers participating in the global intelligence network.

Figure 2:
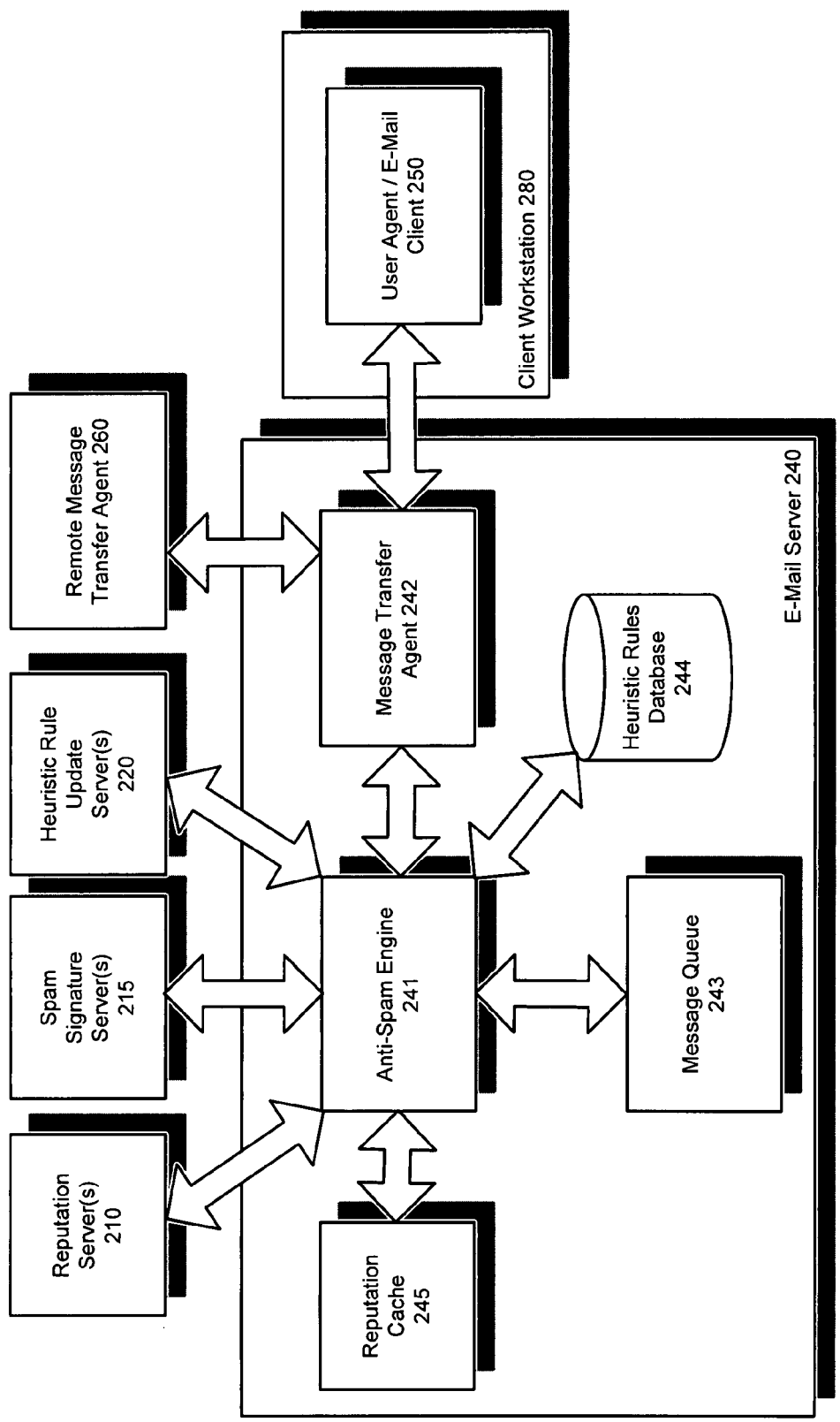
FIG. 2 is a block diagram conceptually illustrating interaction among various functional units of an email server and external entities in accordance with one embodiment of the present invention.

FIG. 2 is a block diagram conceptually illustrating interaction among various functional units of an email server 240 and external entities in accordance with one embodiment of the present invention. According to the present example, e-mail server 240 includes an anti-spam engine 241, a message transfer agent 242, a message queue 243, a heuristic rules database 244 and a reputation cache 245. The e-mail server 240 interfaces with one or more reputation servers 210, one or more spam signature servers 215, one or more heuristic rule update servers 220 and a remote message transfer agent 260 and a user agent/e-mail client 250 of a client workstation 280.

Message transfer agent (MTA) 242 is a program or software agent responsible for receiving, routing, and delivering email messages. In the context of FIG. 1, MTA 242 receives email messages and recipient addresses from local users of client workstations 180, such as client workstation 280, and remote hosts (not shown), performs alias creation and forwarding functions, and delivers the e-mail messages to their destinations. When e-mail messages are originated outside of LAN 150, MTA 242 interacts with a remote MTA, such as remote MTA 260, to facilitate the transfer of the e-mail messages from the remote e-mail server (not shown) with which the remote MTA 260 is associated to e-mail server 240. According to one embodiment and as described further below, prior to transferring outbound e-mail messages to remote MTA 260 and/or receiving or delivering inbound e-mail messages to client workstation 280, MTA 242 requests anti-spam engine 241 to perform one or more content analysis or filtering functions.

According to one embodiment, anti-spam engine 241 represents one of a large network of geographically distributed anti-spam engines (not shown), which all concurrently analyze their respective e-mail message traffic flows with the assistance of the global intelligence servers 225. As described in further detail below, anti-spam engine 241 may initially determine whether to accept email protocol connections, such as SMTP connections, based on sender reputation information that may reside in a local reputation cache 245 or which may be accessed from the reputation servers 210. After a connection is accepted and an inbound message is received locally, analysis of the message by the anti-spam engine 241 to determine whether it is spam may involve one or more spam filtering algorithms, including (i) application of heuristic rules stored in a local heuristic rules database 244 and updated periodically based on current heuristic rules made available to participating anti-spam engines by the heuristic rule update servers 220 and (ii) application of various types of spam signatures by global intelligence servers 225.

In the present example, to the extent sender reputation information does not change very often, the reputation cache 245 may temporarily locally store sender reputation information recently obtained from reputation servers 210. Depending upon the particular implementation and the desired balance of trading off space (e.g., RAM or disk) for extra speed, the reputation cache 245 may employ various caching mechanisms. Exemplary caching algorithms include Least Recently Used (LRU), Most Recently Used (MRU), Pseudo-LRU (PLRU), Least Frequently Used (LFU) and Adaptive Replacement Cache (ARC). Depending on the size of the reputation cache 245, no caching algorithm to discard sender reputation information may be necessary at all; however, to avoid use of out-of-date information, it is still desirable in embodiments using a reputation cache 254 to expire cached sender reputation information at least at the rate at which it is reasonably expected to be updated within the reputation servers 210. In alternative embodiments, no reputation cache 245 may be implemented if the sender reputation information is updated frequently enough and can be retrieved from the reputation servers 210 in a reasonable amount of time consistent with real-time e-mail message processing.

According to one embodiment, all or some part of the spam detection algorithms used by the anti-spam engine 241 are upgradeable. According to the present example, the anti-spam engine 241 employs heuristic rules stored in the heuristic rules database 244 as part of its spam detection process. The heuristic rules may be updated by the heuristic rule update servers 220 periodically or responsive to various events. For example, in one embodiment, the heuristic rule update servers 220 push updated heuristic rules to participating anti-spam engines responsive to corresponding updates at the heuristic rule update servers 220 resulting from the central intelligence gathering performed by global intelligence servers, such as global intelligence servers 125. Advantageously, in such an embodiment, spam detection may be adjusted in real-time based on observations of spam trends by the global intelligence servers.

In the current example, the message queue 243 provides temporary storage for e-mail messages that have already been processed by the anti-spam engine 241. In one embodiment, the message queue 243 holds e-mail messages for which the anti-spam engine 241 could not, at the time of processing of such email messages, arrive at an unequivocal determination regarding the spam classification (e.g., clean or spam) of such e-mail messages. For example, responsive to a signature reputation query by the anti-spam engine 241, the spam score returned by the spam signature servers 215 may not fall within a predetermined or configurable spam or clean threshold value range. In such a case, the e-mail message at issue may be queued (temporarily quarantined) in the message queue 243 to provide an opportunity for global intelligence to be gathered from other participating anti-spam engines regarding the signature associated with the e-mail message at issue. After a predetermined or configurable delay, the previously unclassifiable e-mail message may be re-evaluated by the anti-spam engine 241 again querying the spam signature servers 115 to receive current signature reputation information. Such a delayed re-evaluation is thought to provide a more accurate detection of spam, especially in the context of new spam outbreaks.

The present example, also illustrates a novel 3-tier architecture that may be exploited by embodiments of the present invention. The anti-spam engine 241 queries the reputation servers 210 and the spam signature servers 215 as needed for remotely hosted sender reputation information and signature reputation information. Advantageously, in this manner, the anti-spam engine 241 has access to large amounts of sender reputation information and signature reputation information that can be frequently updated without overloading the anti-spam engine 241 and without degrading its spam detection efficacy by simply requesting application of relevant sender reputation information and signature reputation information on an as needed basis.

In one embodiment, the heuristic rule update servers 220 pushes updates to the anti-spam engine 241. Because the heuristic rule updates are relatively small in size, in a typical implementation, the full set of heuristic rules would be downloaded to the anti-spam engine 241. According to one embodiment, the anti-spam engine 241 performs spam detection using both (i) the query results from the reputation servers 210 and the spam signature servers 215; and (ii) updated heuristic rules provided by the heuristic rule update servers 220 and stored locally in the heuristic rules database 244. Furthermore, in one embodiment, the heuristic rules used may be dependent upon the query results. That is, the particular heuristic rules applied during spam detection can change based on the query results from the reputation servers 210 and/or the spam signature servers 215.

Rather than re-evaluating e-mail messages in the message queue 243 at a configurable or predetermined time, in another embodiment, one or more predetermined events may trigger message re-evaluation processing. For example, e-mail messages in the message queue 243 may be re-evaluated responsive to (i) an update of the heuristic rules in the heuristic rules database 244; (ii) an indication from the reputation servers 210 that its sender reputation information has been updated or that particular sender reputation information of interest to the anti-spam engine 241 has been updated; and/or (iii) an indication from the spam signature servers 215 that its signature reputation information has been updated or that particular signature reputation information of interest to the anti-spam engine 241 has been updated.

In one embodiment, multiple queues may be implemented for messages having different classes of signatures. In such an embodiment, messages in the queues associated with the classes of signatures that have been updated can be re-evaluated independently of messages in queues associated with classes of signatures that have yet to be updated.

In one embodiment, the functionality of the separate functional units may be merged in various combinations. For example, the anti-spam engine 241 may be incorporated with the message transfer agent 242 and the heuristic rule update servers 220 and/or the reputation servers 210 may be combined with the global intelligence servers 225.

Furthermore, as indicated above, for sake of illustration, various embodiments of the present invention are described in the context of an email server; however, such examples are not intended to limit the scope of the present invention. Rather, the anti-spam methodologies described herein have applicability to email and network devices and software generally including, client workstations, email client software, network gateways, firewalls and other email and network devices though which email passes.

Figure 3:
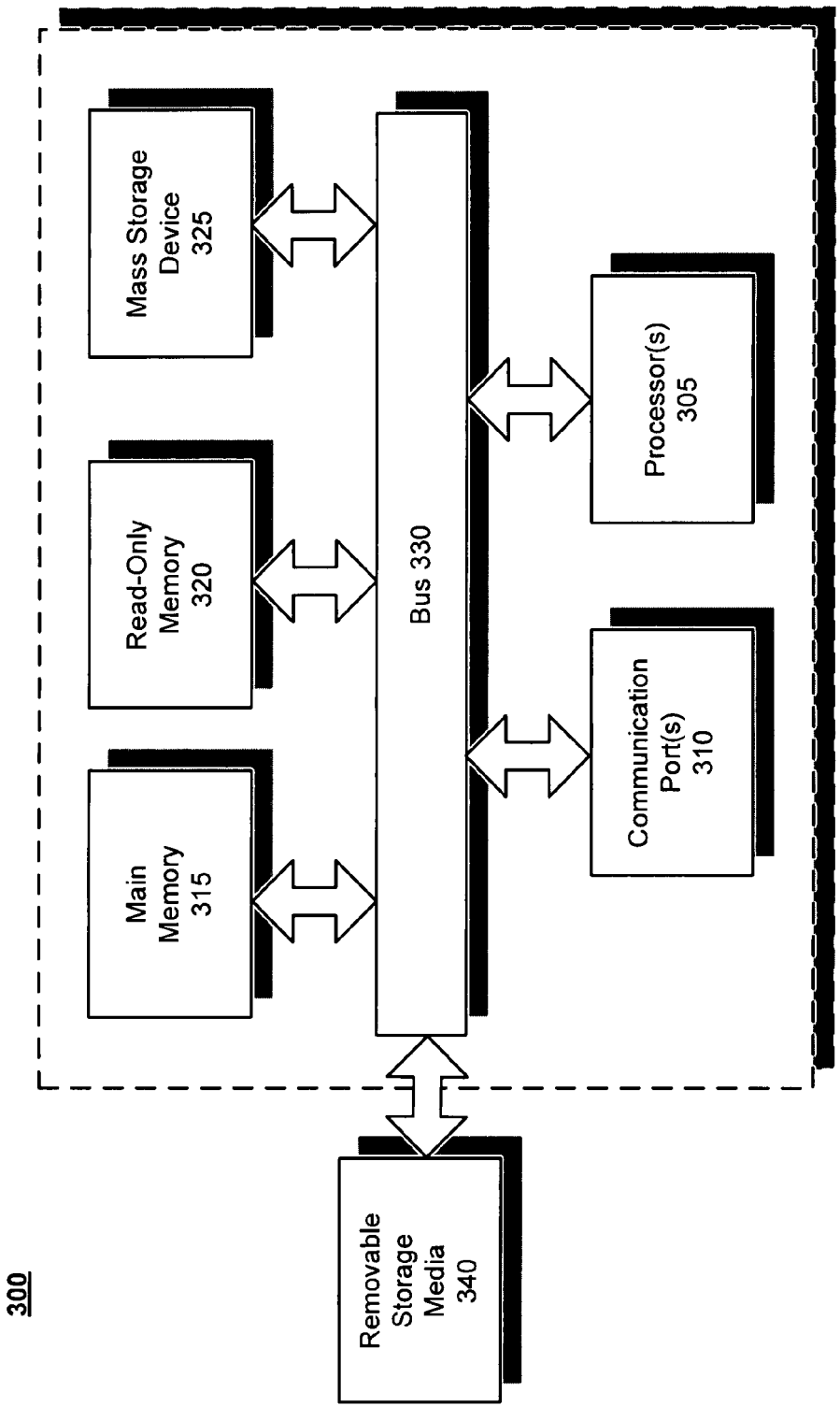
FIG. 3 is an example of a computer system with which embodiments of the present invention may be utilized.

FIG. 3 is an example of a computer system with which embodiments of the present invention may be utilized. The computer system 300 may represent or form a part of an email server, client workstation, network gateway, firewall, network security appliance, switch, bridge, router and/or other network device implementing one or more of the reputation cache 245, the anti-spam engine 241, the message queue 243 and the heuristic rules database 244. According to FIG. 3, the computer system 300 includes one or more processors 305, one or more communication ports 310, main memory 315, read only memory 320, mass storage 325, a bus 330, and removable storage media 340.

The processor(s) 305 may be Intel® Itanium® or Itanium 2® processor(s), AMD® Opteron® or Athlon MP® processor(s) or other processors known in the art.

Communication port(s) 310 represent physical and/or logical ports. For example communication port(s) may be any of an RS-232 port for use with a modem based dialup connection, a 10/100 Ethernet port, or a Gigabit port using copper or fiber. Communication port(s) 310 may be chosen depending on a network such a Local Area Network (LAN), Wide Area Network (WAN), or any network to which the computer system 300 connects. Communication port(s) 310 may also be the name of the end of a logical connection (e.g., a Transmission Control Protocol (TCP) port or a Universal Datagram Protocol (UDP) port). For example communication ports may be one of the Well Know Ports, such as SMTP port 25, assigned by the Internet Assigned Numbers Authority (IANA) for specific uses.

Main memory 315 may be Random Access Memory (RAM), or any other dynamic storage device(s) commonly known in the art.

Read only memory 320 may be any static storage device(s) such as Programmable Read Only Memory (PROM) chips for storing static information such as instructions for processors 305.

Mass storage 325 may be used to store information and instructions. For example, hard disks such as the Adaptec® family of SCSI drives, an optical disc, an array of disks such as RAID, such as the Adaptec family of RAID drives, or any other mass storage devices may be used.

Bus 330 communicatively couples processor(s) 305 with the other memory, storage and communication blocks. Bus 330 may be a PCI/PCI-X or SCSI based system bus depending on the storage devices used.

Optional removable storage media 340 may be any kind of external hard-drives, floppy drives, IOMEGA® Zip Drives, Compact Disc-Read Only Memory (CD-ROM), Compact Disc-Re-Writable (CD-RW), Digital Video Disk (DVD)-Read Only Memory (DVD-ROM), Re-Writable DVD and the like.

Optionally, operator and administrative interfaces (not shown), such as a display, keyboard, and a cursor control device, may also be coupled to bus 330 to support direct operator interaction with computer system 100. Other operator and administrative interfaces can be provided through network connections connected through communication ports 310.

Figure 4:
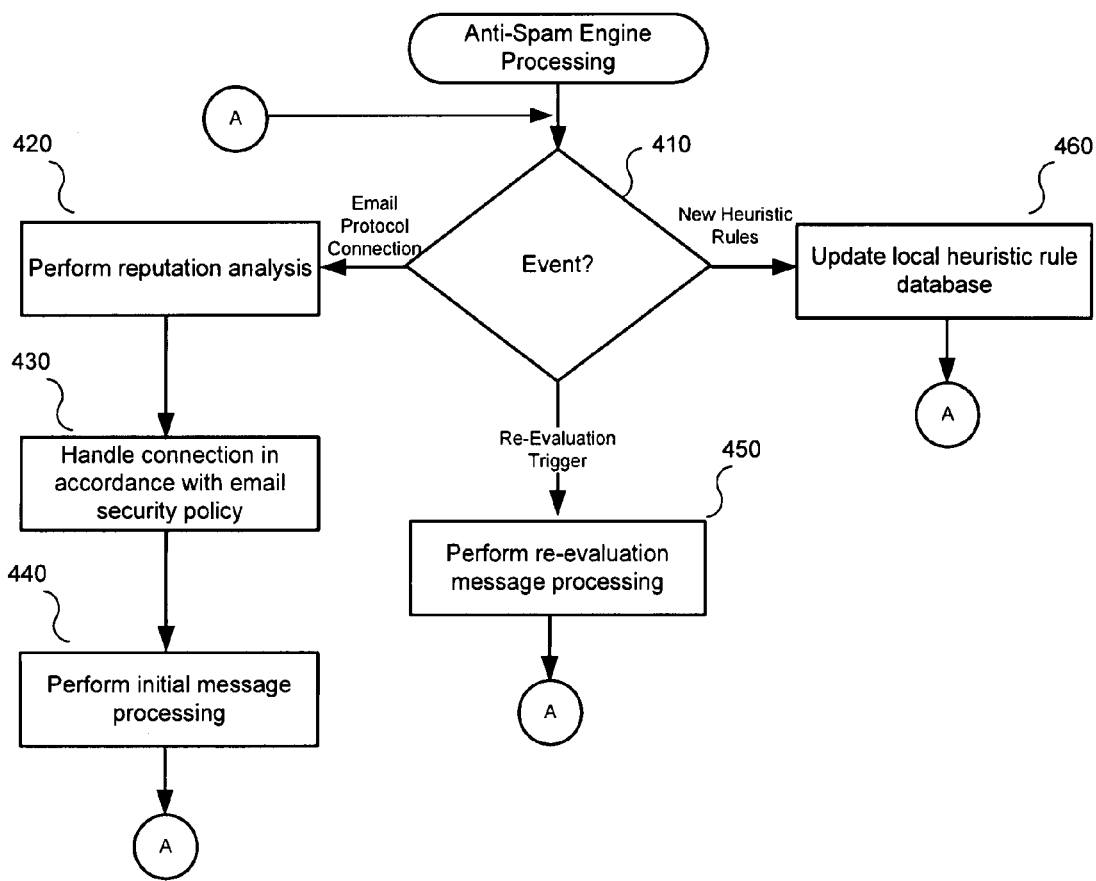
FIG. 4 is a high-level, simplified flow diagram illustrating anti-spam engine processing in accordance with an embodiment of the present invention.

FIG. 4 is a high-level, simplified flow diagram illustrating anti-spam engine processing in accordance with an embodiment of the present invention. As indicated above, the anti-spam processing described herein may be concurrently performed by a global network of anti-spam engines that collectively operate as intelligence gathering agents on behalf of the global intelligence servers 125. At any rate, anti-spam engine processing begins at decision block 410 at which the anti-spam engine waits for an indication regarding various predefined events. In the present example, the predefined events include (i) receipt of an email protocol connection request; (ii) receipt of new heuristic rules; and (ii) the occurrence of a re-evaluation trigger. Upon receipt of an email protocol connection request, e.g., a SMTP connection or other email protocol event representing the start of receipt of a message, anti-spam engine processing continues with block 420. If the occurrence of a re-evaluation trigger is detected, then anti-spam engine processing branches to block 450. When a heuristic rule update is received, anti-spam engine processing continues with block 460.

At block 420, reputation analysis is performed. In one embodiment, reputation analysis comprises the anti-spam engine 241 querying the reputation servers 210 and/or the global intelligence servers 125 for the sender reputation of the originator of the connection request. The reputation analysis may involve a cache-lookup in a local reputation cache, such as reputation cache 245, prior to or instead of querying the reputation servers 210 and/or the global intelligence servers 125.

At block 430, the connection request is handled in accordance with e-mail security policy. If the originator of the connection request is deemed trustworthy, then the connection may be accepted. For example, originator of the connection request has a sender reputation that meets or exceeds a predefined or configurable trustworthiness threshold, any e-mail the originator has for local client workstations may be transferred from the remote MTA 260 to the local MTA 242. If, however, the originator of the connection is not deemed trustworthy, then the connection may be dropped.

Assuming the connection has been accepted, at block 440, initial message processing is performed by the anti-spam engine 241. Further information regarding initial message processing is described below with reference to FIG. 5.

At block 450, a re-evaluation trigger event has been detected. Responsive to the re-evaluation trigger, the anti-spam engine 241 performs re-evaluation message processing, which is described further below with reference to FIG. 6. In one embodiment, the re-evaluation trigger may be the passing of a predetermined amount of time, e.g., 1 to 10 minutes, since the initial message processing was performed. In one embodiment, re-evaluation may be triggered approximately every 5 minutes. In alternative embodiments, the re-evaluation trigger may be receipt of new heuristic rules, receipt of an indication from the global intelligence servers 125 or the reputation servers 110 that signature reputation information has been updated, receipt of an indication that sender reputation information has been updated, receipt of an indication that signature reputation information residing in the spam signature databases 116 has been updated and/or the like.

In an ideal scenario, rather than re-evaluating an e-mail message under conditions that are expected to yield the same result as the previous evaluation, an e-mail message would be re-evaluated (i) responsive to signature reputation information relevant to classifying that particular message as clean/spam being updated; or (ii) responsive to heuristic rules affecting classification of that particular message as clean/spam. Such an ideal may not be achievable; and therefore, timers or more general events may be relied upon to provide a reasonable approximation to the ideal scenario. In one embodiment, the anti-spam engine's previous query for signature reputation information associated with a particular e-mail message signature may operate as a subscription on behalf of the anti-spam engine to updates with respect to the particular signature or a class of signatures within which the particular signature falls.

At block 460, new heuristic rules are available. In one embodiment, the new heuristic rules event indicates the new heuristic rules have been received. In other embodiments, this event indicates the availability of updated heuristic rules at the heuristic rule update servers 120 determined as a result of polling the heuristic rules update servers 110 or a notification having been received from the heuristic rules update servers 110. Either a push or pull technology model may be employed to update the locally stored heuristic rules. In any case, once new heuristic rules are on hand, the updated rules may replace the existing heuristic rules in the heuristic rules database 244, thereby updating a portion of the local anti-spam detection algorithm.

While according to the present example, only two message processing activities are illustrated, i.e., the initial message processing of block 440 and the re-evaluation message processing of block 450, in alternative embodiments more than one re-evaluation cycle may be performed if the second re-evaluation still results in an inconclusive classification as spam/clean. Additionally, the re-evaluation processing may include performing reputation analysis, such as that described with reference to block 420.

Figure 5:
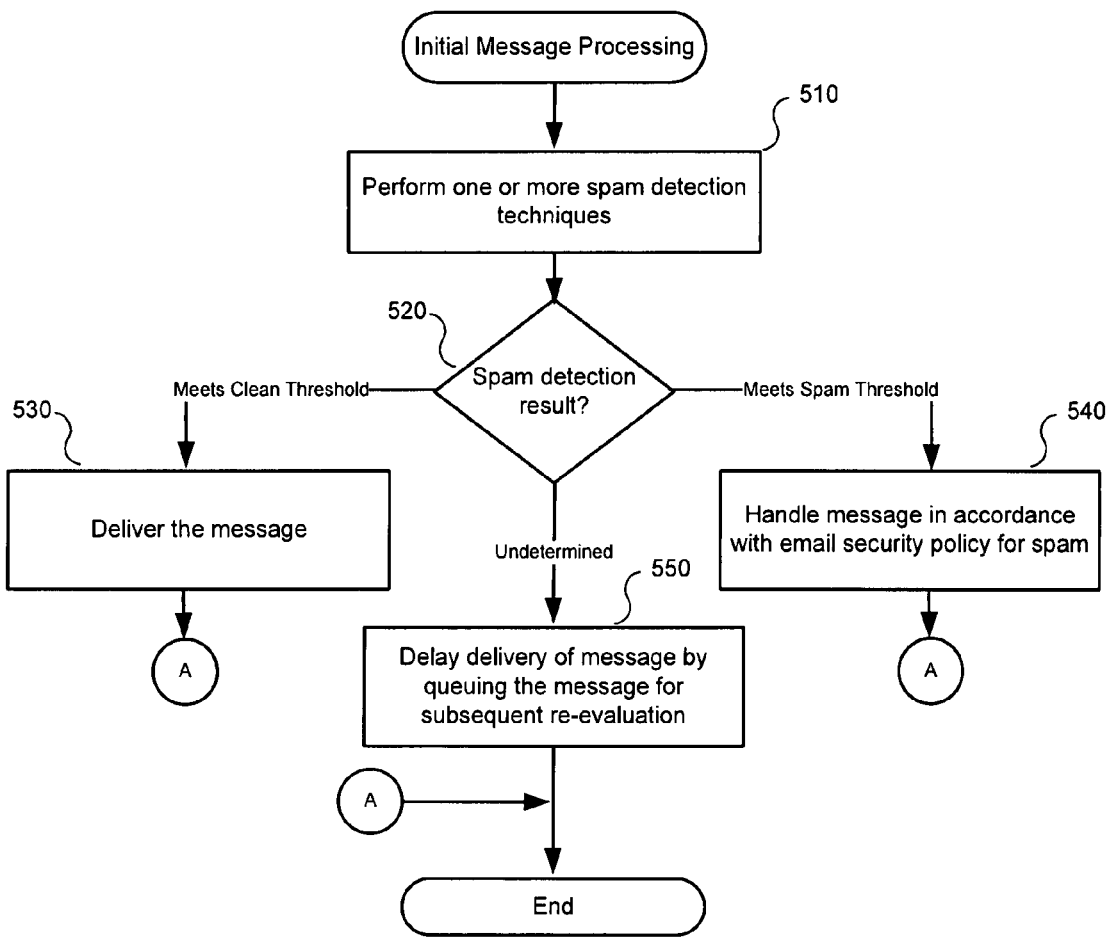
FIG. 5 is a flow diagram illustrating initial message processing in accordance with an embodiment of the present invention.

FIG. 5 is a flow diagram illustrating initial message processing in accordance with an embodiment of the present invention. According to the present example, at block 510, one or more spam detection techniques are performed on the e-mail message at issue. Other than as dictated by the timing tradeoffs of the particular implementation, there is no limit to the type or number of spam detection techniques that may be employed by the anti-spam engine 241. Certainly, given the context of delayed re-evaluation based on the gathering of global intelligence to provide more accurate results, those anti-spam techniques that can be weighted or adjusted based on observed trends are more desirable than those that cannot. In one embodiment, both spam signatures and heuristic rules are used to determine whether the e-mail at issue is spam. In other embodiment, various other combinations of spam detection techniques and content analysis may be employed, including, but not limited to reverse DNS checks, white listing, Bayesian classifiers and the like. Furthermore, the spam detection techniques may be combined, weighted or voted in different manners. For example, the output of one spam detection algorithm may serve as an input to another. Alternatively, the outputs of the spam detection algorithms employed may be averaged to arrive at a spam/clean determination or score.

At decision block 520, the anti-spam engine 241 determines how to handle the e-mail message based on the spam detection result produced by block 510. According to the present example, if the result or scoring of the e-mail message at issue does not meet a predetermined or configurable clean threshold, then initial message processing continues with block 530. If the spam detection result meets a predetermined or configurable spam threshold, then initial message processing branches to block 540; otherwise, If the spam detection result is undetermined or inconclusive, then the processing continues with block 550.

At block 530, the e-mail message at issue has been determined to be clean and the message is delivered and made accessible to the end user(s) to which the e-mail message is addressed.

At block 540, the email message at issue has been determined to be spam. The spam is handled in accordance with email security policy for spam. For example, the spam may be, among other things, deleted, quarantined, delivered into a junk email folder, delivered with a modified subject line, e.g., the original subject preceded by "[SPAM]," "JUNK," or the like.

At block 550, a satisfactory determination regarding the spam or clean nature of the email message at issue was not capable of being made by the one or more spam detection techniques. Consequently, the delivery of the e-mail message at issue is delayed by queuing the message for subsequent re-evaluation at a later time. In effect, the e-mail message is temporarily quarantined pending re-evaluation. In one embodiment, the e-mail message at issue is queued on the device, e.g., the email server 140 or the network gateway 130, which performed the initial message processing. In another embodiment, the device performing the initial message processing may simply flag the e-mail message for subsequent re-evaluation and proceed to transfer the email message at issue to another device, e.g., the e-mail server 140 or the client workstation 180, at which it is queued and later re-evaluated. In yet other embodiments, various other device combinations may perform one or more of initial message processing, queuing and re-evaluation processing.

Again, while various examples described herein are described with reference to the simplified architecture of FIG. 1 and the email server 240 of FIG. 2, it is important to note that the initial message processing described above may be performed at various other devices depicted or not depicted in the simplified network architecture of FIG. 1. For example, the initial message processing may be performed by the network gateway 130, the e-mail server 140, the client workstations 180, a router, switch, firewall or other devices through which e-mail messages pass. The initial message processing may also be distributed among multiple devices.

Figure 6:
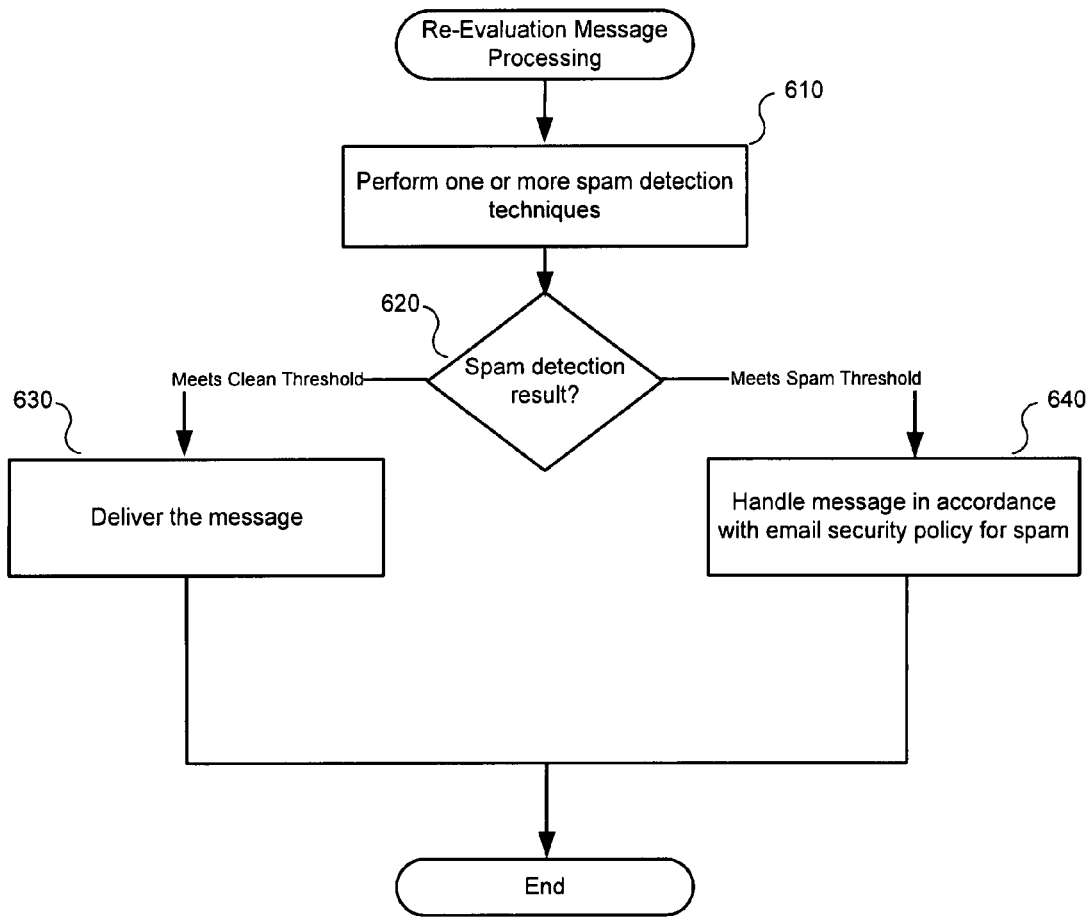
FIG. 6 is a flow diagram illustrating re-evaluation message processing in accordance with an embodiment of the present invention.

FIG. 6 is a flow diagram illustrating re-evaluation message processing in accordance with an embodiment of the present invention. According to one embodiment, the re-evaluation message processing is triggered by a re-evaluation event, e.g., the expiration of a timer set upon the completion of initial message processing, a configurable or predetermined interval timer, update of the heuristic rules in the heuristic rules database 244, the existence of updated general or specific signature reputation information at the global intelligence servers 225 or the like. Depending upon the particular implementation, one queued e-mail message may be re-evaluated or more than one queued e-mail message may be re-evaluated (e.g., those queued greater than or equal to a certain amount of time ago). At any rate, according to the present example, at block 610, one or more spam detection techniques are performed on the e-mail message at issue. According to one embodiment, the e-mail message at issue has already been subjected to an initial message processing, but the spam detection result of the initial message processing was inconclusive with respect to the spam/clean nature of the e-mail in question. At this point, some time has passed and presumably general or specific signature reputation information has been updated at the global intelligence servers 125 and/or updated heuristic rules are present in the heuristic rules database 244. In any event, the one or more spam detection techniques may be the same as those previously applied to the e-mail message at issue during the initial message processing a subset of those previously applied or a completely different set of spam detection techniques. In one embodiment, a spam detection technique that may be included among the one or more spam detection techniques performed consists of a re-evaluation of the sender reputation, such as that performed in block 420 of FIG. 4.

At decision block 620, the anti-spam engine 241 determines how to handle the e-mail message at issue based on the spam detection result produced by block 610. According to the present example, if the result or scoring of the e-mail message at issue meets a predetermined or configurable clean threshold, then re-evaluation message processing continues with block 630; otherwise, processing branches to block 640.

At block 630, the e-mail message at issue has been determined to be clean and the message is delivered and made accessible to the end user(s) to which the e-mail message is addressed.

At block 640, the email message at issue is assumed to be spam. The spam is handled in accordance with email security policy for spam. For example, the spam may be deleted, quarantined, delivered into a junk email folder, delivered with a modified subject line, e.g., the original subject preceded by "[SPAM]," "JUNK," or the like.

Again, while various examples described herein are described with reference to the simplified architecture of FIG. 1 and the email server 240 of FIG. 2, it is important to note that the re-evaluation message processing described above may be performed at various other devices depicted or not depicted in the simplified network architecture of FIG. 1. For example, the re-evaluation message processing may be performed by the network gateway 130, the e-mail server 140, the client workstations 180, a router, switch, firewall or other devices through which e-mail messages pass. The re-evaluation message processing may also be distributed among multiple devices. Furthermore, the re-evaluation message processing may be performed on the same or a different device than the initial message processing. Finally, although a single re-evaluation message processing is described herein, it is to be understood that more than one re-evaluation message processing iteration may be performed as feasible within the particular usage environment if the re-evaluation message processing still results in an uncertain classification of the e-mail message at issue.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
   performing, by an anti-spam engine of a network of a plurality of anti-spam engines participating in a global intelligence network, an initial spam detection process on an electronic mail (e-mail) message received from a sender, the initial spam detection process including (i) considering a spam score associated with the e-mail message by forming a signature of the e-mail message based on attributes extracted from the e-mail message and querying a remote server associated with the global intelligence network that maintains and updates spam score information based on direct or indirect observations and analysis of queries from the plurality of anti-spam engines, (ii) considering a sender Internet Protocol (IP) reputation associated with the sender by evaluating reputation information supplied by a remote reputation server associated with the global intelligence network and (iii) applying, to the e-mail message, heuristic rules, which are updated by a remote heuristic rule update server associated with the global intelligence network to adapt to changes in spam trends observed by the global intelligence network based on direct or indirect observations and analysis of query volume or patterns for e-mail message signatures received from the plurality of anti-spam engines;
   attempting to classify the received e-mail message, by the anti-spam engine, as clean or spam based on the initial spam detection process;
   if the received e-mail message cannot be unambiguously classified as being clean or spam in real-time based on the initial spam detection process, then providing, by the anti-spam engine, an opportunity for global intelligence to be gathered by the global intelligence network regarding the e-mail message or e-mail messages having similar attributes by queuing the e-mail message for a re-evaluation spam detection process to be performed at a later time;
   classifying, by the anti-spam engine, the queued e-mail message by performing the re-evaluation spam detection process, including re-evaluation of the spam score, re-evaluation of the sender IP reputation and reapplication of the heuristic rules, the re-evaluation spam detection process providing a more accurate categorization result than the initial spam detection process;
   handling the queued e-mail message, by the anti-spam engine, in accordance with a policy associated with the more accurate categorization result; and
   wherein the anti-spam engine is implemented in one or more processors and one or more computer-readable storage media of one or more computer systems, the one or more computer-readable storage media having instructions tangibly embodied therein representing the anti-spam engine that are executable by the one or more processors.

2. The method of claim 1, wherein the initial spam detection process is performed by an e-mail server.

3. The method of claim 2, wherein the re-evaluation spam detection process is performed by an e-mail client.

4. The method of claim 1, wherein the initial spam detection process is performed by a network gateway.

5. The method of claim 4, wherein the re-evaluation spam detection process is performed by an e-mail client.

6. The method of claim 1, wherein said performing the re-evaluation spam detection process is triggered responsive to a re-evaluation event.

7. The method of claim 6, wherein the re-evaluation event comprises one or more of:
   existence of updated spam score information within the global intelligence network;
   existence of updated sender reputation information within the global intelligence network;
   availability of updated heuristic rules;
   passing of a predetermined amount of time since the initial spam detection process was performed; and
   expiration of an interval timer.

8. A non-transitory program storage device readable by one or more processors of a computer system, tangibly embodying a program of instructions executable by the one or more processors to perform method steps for performing spam detection, said method steps comprising:
   performing, by an anti-spam engine of a network of a plurality of anti-spam engines participating in a global intelligence network, an initial spam detection process on an electronic mail (e-mail) message received from a sender, the initial spam detection process including (i) considering a spam score associated with the e-mail message by forming a signature of the e-mail message based on attributes extracted from the e-mail message and querying a remote server associated with the global intelligence network that maintains and updates spam score information based on direct or indirect observations and analysis of queries from the plurality of anti-spam engines, (ii) considering a sender Internet Protocol (IP) reputation associated with the sender by evaluating reputation information supplied by a remote reputation server associated with the global intelligence network and (iii) applying, to the e-mail message, heuristic rules, which are updated by a remote heuristic rule update server associated with the global intelligence network to adapt to changes in spam trends observed by the global intelligence network based on direct or indirect observations and analysis of query volume or patterns for e-mail message signatures received from the plurality of anti-spam engines;

attempting to classify the received e-mail message as clean or spam based on the initial spam detection process;

if the received e-mail message cannot be unambiguously classified as being clean or spam in real-time based on the initial spam detection process, then providing an opportunity for global intelligence to be gathered by the global intelligence network regarding the e-mail message or e-mail messages having similar attributes by queuing the e-mail message for a re-evaluation spam detection process to be performed at a later time;

classifying the queued e-mail message by performing the re-evaluation spam detection process, including re-evaluation of the spam score, re-evaluation of the sender IP reputation and reapplication of the heuristic rules, the re-evaluation spam detection process providing a more accurate categorization result than the initial spam detection process; and handling the queued e-mail message in accordance with a policy associated with the more accurate categorization result.

9. The program storage device of claim 8, wherein the initial spam detection process is performed by an e-mail server.

10. The program storage device of claim 9, wherein the re-evaluation spam detection process is performed by an e-mail client.

11. The program storage device of claim 8, wherein the initial spam detection process is performed by a network gateway.

12. The program storage device of claim 11, wherein the re-evaluation spam detection process is performed by an e-mail client.

13. The program storage device of claim 8, wherein said performing the re-evaluation spam detection process is triggered responsive to a re-evaluation event.

14. The program storage device of claim 13, wherein the re-evaluation event comprises one or more of:
- existence of updated spam score information within the global intelligence network;
- existence of updated sender reputation information within the global intelligence network;
- availability of updated heuristic rules;
- passing of a predetermined amount of time since the initial spam detection process was performed; and
- expiration of an interval timer.

* * * * *